United States Patent
Qiang et al.

(10) Patent No.: US 11,984,934 B2
(45) Date of Patent: May 14, 2024

(54) INTEGRATED PHOTONIC CHIP STRUCTURE FOR UNIVERSAL QUANTUM WALK SIMULATION

(71) Applicant: NATIONAL UNIVERSITY OF DEFENSE TECHNOLOGY, Hunan (CN)

(72) Inventors: Xiaogang Qiang, Hunan (CN); Junjie Wu, Hunan (CN); Yizhi Wang, Hunan (CN)

(73) Assignee: NATIONAL UNIVERSITY OF DEFENSE TECHNOLOGY, Hunan (CN)

( * ) Notice: Subject to any disclaimer, the term of this patent is extended or adjusted under 35 U.S.C. 154(b) by 572 days.

(21) Appl. No.: 17/228,719

(22) Filed: Apr. 13, 2021

(65) Prior Publication Data
US 2021/0320725 A1    Oct. 14, 2021

(30) Foreign Application Priority Data
Apr. 13, 2020  (CN) .......................... 202010284768.1

(51) Int. Cl.
| | | |
|---|---|---|
| H04B 10/70 | (2013.01) | |
| G01J 1/44 | (2006.01) | |
| G02F 1/21 | (2006.01) | |
| G06N 10/00 | (2022.01) | |

(52) U.S. Cl.
CPC .............. *H04B 10/70* (2013.01); *G01J 1/44* (2013.01); *G02F 1/212* (2021.01); *G06N 10/00* (2019.01); *G01J 2001/442* (2013.01)

(58) Field of Classification Search
CPC ...... H04B 10/70; G01J 1/44; G01J 2001/442; G02F 1/212; G06N 10/00; G06N 10/40; G06N 10/60; H04L 9/0852; H04L 9/0858
See application file for complete search history.

(56) References Cited

U.S. PATENT DOCUMENTS 9,354,039 B2 * 5/2016 Mower .............. G01B 9/02083

OTHER PUBLICATIONS

Jianwei Wang et al., "Multidimensional quantum entanglement with large-scale integrated optics." Science 360, 285-291 (2018). DOI:10.1126/science.aar7053 (Year: 2018).*

* cited by examiner

Primary Examiner — Thanh Luu
Assistant Examiner — Monica T Taba
(74) Attorney, Agent, or Firm — JCIP GLOBAL INC.

(57) ABSTRACT

The present invention discloses an integrated photonic chip structure for universal quantum walk simulation which combines the multiphoton source that can generate the spatially entangled multi-photon state and the linear optical network that can implement the unitary transformation, and establishes mapping between on-chip spatial-entangled multi-photon state and quantum walk state and mapping between on-chip linear optical unitary transformation and the evolution process of multi-particle quantum walk. By manipulating the spatially entangled multi-photon state generated via the multi-photon sources and the optical unitary transformation implemented via the universal linear optical networks, the chip structure can implement universal quantum walk simulation with the control over all parameters of multiple-particle quantum walks including such as evolution Hamiltonian, evolution time, initial evolution state and particle properties (i.e., particle indistinguishability and particle exchange symmetry).

3 Claims, 3 Drawing Sheets

INTEGRATED PHOTONIC CHIP STRUCTURE FOR UNIVERSAL QUANTUM WALK SIMULATION

CROSS-REFERENCE TO RELATED APPLICATION

This application claims the priority benefit of China application serial no. 202010284768.1, filed on Apr. 13, 2020. The entirety of the above-mentioned patent application is hereby incorporated by reference herein and made a part of this specification.

TECHNICAL FIELD

The present invention relates to a photonic chip structure for universal quantum walk simulation based on quantum computing theory and integrated photonic techniques, which can implement universal multiple-particle quantum walk simulation with the control over all parameters of multiple-particle quantum walks such as evolution Hamiltonian, evolution time, initial state and particle properties (i.e. particle indistinguishability and particle exchange symmetry). The present invention belongs to the field of quantum computing and integrated photonics.

BACKGROUND OF THE INVENTION

Quantum walk is the quantum analog of the classical random walk model, and used to describe a physical process in which quantum particles move stochastically around a discrete space. Such a discrete space can usually be represented mathematically by a graph consisting of vertices and edges, and the adjacency matrix of a graph gives the Hamiltonian for evolution process of the quantum walk. Due to the quantum effects such as superposition, quantum interference and entanglement, quantum walk shows different characteristics from the classical random walk, and it has great potentials in quantum computing applications. Like that classical random walk is broadly used in many computing applications, various quantum algorithms based on quantum walks have been proposed in the recent years, showing surpassing performance over the classical algorithms. These quantum algorithms are applied to solve different problems like graph traversal, database search and graph isomorphism, achieving polynomial and even exponential quantum speedup. These quantum walk-based algorithms could be further used in practical applications such as web search, traffic optimization and computer vision.

The capability of quantum walk for computing applications relies on the dimension of the corresponding Hilbert space that could increase exponentially with the number of particles involved in the quantum walk evolution process. Furthermore, the structure of the Hilbert space is also related to the properties of the particles involved in the quantum walk evolution process, such as particle indistinguishability and particle exchange symmetry. With the control over the evolution Hamiltonian, evolution time, initial state, particle properties, quantum walk with different parameters can be implemented, which further allows to simulate complex quantum walk dynamics and implement complicated quantum walk-based algorithms for applications that are intractable for classical algorithms. When quantum walk-based algorithms were used in practical applications, different problem instances require reconfigurability over the parameters of quantum walk evolution including the evolution Hamiltonian, evolution time, initial evolution state and particle properties.

Experimental demonstrations of small-scale quantum walks have been presented in different physical systems such as nuclear magnetic resonance, ion trap, trapped atom and photonic systems. However, most of these demonstrations can only implement quantum walk evolutions with specific Hamiltonians, and have limited control over the parameters of quantum walk evolution. Among these physical systems, integrated quantum photonics allows to integrate many optical components into a single chip by using semiconductor micro/nano manufacturing technology. It has high compacity, high stability, high precision and high scalability and thus provides a feasible way for large-scale quantum simulation system. Integrated quantum photonics develops rapidly in recent years, and many key components have been implemented, including high-quality single-photon sources, entangled photon sources, reconfigurable optical networks, optical beam splitters, thermo-optic phase shifters and so on. With these components, a single device enabling to generate, manipulate and measure photonic quantum states can be implemented by utilizing specific schemes. This thus makes it possible to build an integrated, miniaturized and scalable quantum walk processors.

SUMMARY OF THE INVENTION

Object of the present invention: In order to enable reconfigurability in the quantum walk processors for practical applications, the present invention provides an integrated photonic chip structure for universal quantum walk simulation, in which various parameters of multi-particle quantum walks such as evolution Hamiltonian, evolution time, initial state and particle properties can be reconfigured.

Technical solution: In order to achieve the above object, the present invention adopts the following technical solution:

An integrated photonic chip structure for universal quantum walk simulation, consisting of a module of reconfigurable entangled multi-photon source and a module of universal linear optical network. In the case of the number of particles involved in quantum walk is $N_{walker}$ and the number of vertices of a graph G is $N_{node}$, the reconfigurable entangled multi-photon sources module comprises $N_{walker}$ sources that each of the sources can generate $N_{walker}$-photons sources, and $[\log_2 N_{walker}]$-level Mach-Zehnder interferometer network, and the $N_{walker}$-photon sources are denoted as $S_1, S_2, \ldots, S_k, \ldots S_{N_{walker}}$ respectively.

The Mach-Zehnder interferometers in the $[\log_2 N_{walker}]$-level Mach-Zehnder interferometer network are listed following the structure of a "binary tree", that is, each output port of the Mach-Zehnder interferometer at a previous level is connected with one input port of the Mach-Zehnder interferometer at the next level, and $2^{\log_2 N_{walker}}$ output ports of the Mach-Zehnder interferometers at the end level are respectively connected with one phase shifter and one $N_{walker}$-photon source.

The universal linear optical network module comprises $N_{walker}$ universal linear optical networks that each is capable of implementing the required $N_{node}$-dimensional unitary transformation, where $N_{walker} \leq N_{node}$, and the $N_{walker}$ universal linear optical networks capable of implementing the required $N_{node}$-dimensional unitary transformation are denoted as $U^{(1)}, U^{(2)}, \ldots, U^{(N_{walker})}$.

Each $N_{walker}$-photon source generates $N_{walker}$ photons of different wavelengths. The photons pass through a wavelength division multiplexer and then are respectively routed to entries of the universal linear optical networks $U^{(1)}$, $U^{(2)}$, ..., $U^{(N_{walker})}$, and the photons generated by the $m^{th}$ $N_{walker}$-photon source $S_m$ are respectively injected into corresponding input ports of each linear optical network according to the sequence $\vec{v}_m$.

The phase shifters in the reconfigurable entangled multiphoton source module are configured according to indistinguishability γ and exchange symmetry φ of the required $N_{walker}$ particles and initial state of the walk, so that corresponding spatially entangled multi-photon state is generated at the entry of each optical network in the universal linear optical network module. Then, the phase shifters in each linear optical network in the universal linear optical network module are configured according to a Hamiltonian $H_G$ and evolution time t of the quantum walk to implement unitary transformation. In the example of universal two-particle quantum walk simulation, two-photon coincidence is measured at an output end of the universal linear optical network module to obtain probability distribution P of output positions of the two photons. According to a deterministic relationship $\Gamma_{r,q}^{65 \cdot \Phi} = \mu P_{r,q}^{\gamma, \phi}$ between the measured probability distribution P of on-chip spatially entangled two-photon state and the theoretical distribution F of two-particle quantum walk, where $\mu = 1/2(1+\gamma+2\gamma\sqrt{1-\gamma^2})$, the distribution Γ of $N_{walker}$ quantum particles of t time of the quantum walk on the graph G can be similarly obtained, with the indistinguishability being γ and exchange symmetry being φ.

Preferably, the Mach-Zehnder interferometer consists of one phase shifter connected with two multimode interferometers.

Preferably, in the simulated quantum walk, the $N_{walker}$ particles are input from $N_{walker}$ ports of the $N_{node}$-dimensional universal linear optical network, port sequences are denoted as $\{k_1, k_2, \ldots, k_{N_{walker}-1}, k_{N_{walker}}\}$, with the sequences being $\vec{v}_1 = \{k_1, k_2, \ldots, k_{N_{walker}-1}, k_{N_{walker}}\}$, $\vec{v}_2 = \{k_{N_{walker}}, k_1, k_2, \ldots, k_{N_{walker}-1}\}$, ... and $\vec{v}_{N_{walker}} = \{k_2, \ldots, k_{N_{walker}}^{-1}, k_{N_{walker}}, k_1\}$, where each serial number k represents the corresponding input port number of the $N_{walker}$ linear optical networks, and $\vec{v}_{p,q}$ represents the $g^{th}$ element of $\vec{v}_p$, and the $N_{walker}$ photons generated by the $m^{th}$ $N_{walker}$-photon source are injected into the corresponding input port of each linear optical network according to sequence $\vec{v}_m$.

Compared with the prior art, the present invention has the following advantages:

The present invention combines multiphoton sources that can prepare the spatially entangled multi-photon state with linear optical networks that can implement the unitary transformation, and establishes mapping between on-chip spatially entangled multi-photon state and quantum walk state and mapping between on-chip unitary transformation and process of multiple-particle quantum walks. By manipulating the spatially entangled multi-photon state generated via the multiphoton sources and the optical unitary transformation implemented by the universal linear optical networks, the chip structure can perform universal quantum walk simulation with the control over all parameters of multiple-particle quantum walk such as evolution Hamiltonian, evolution time, initial evolution state and particle properties (i.e. particle indistinguishability and particle exchange symmetry).

DETAILED DESCRIPTION OF THE PREFERRED EMBODIMENTS

The present invention is further illustrated in combination with drawings and specific embodiments. It should be understood that these examples are only used to describe the present invention instead of limiting scope thereof. The modifications of various equivalent forms made by those skilled in the art reading the specification of the present invention fall within the scope defined by the claims attached to the present application.

Figure 1:
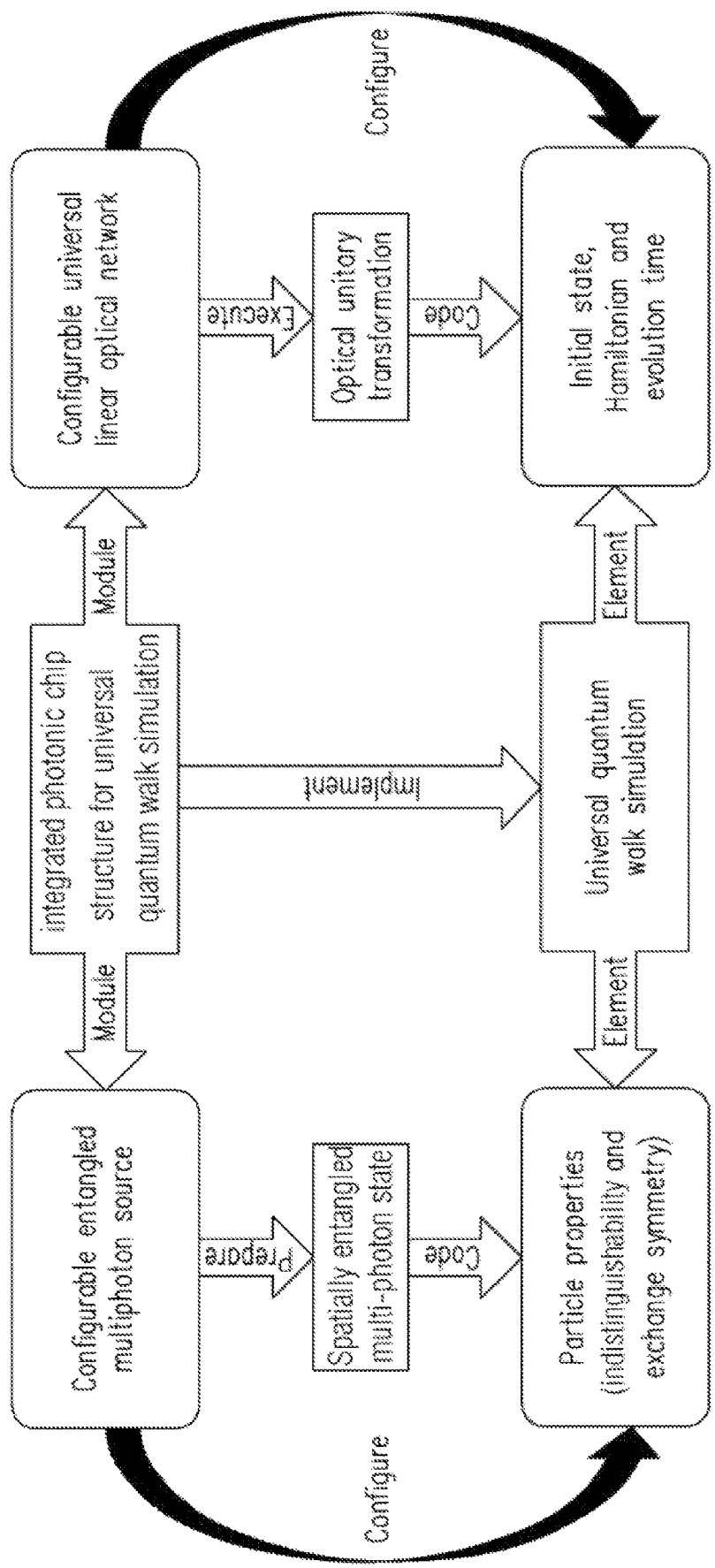
FIG. 1 is a schematic diagram of a technical solution of integrated photonic chip structure for universal quantum walk simulation.
Figure 2:
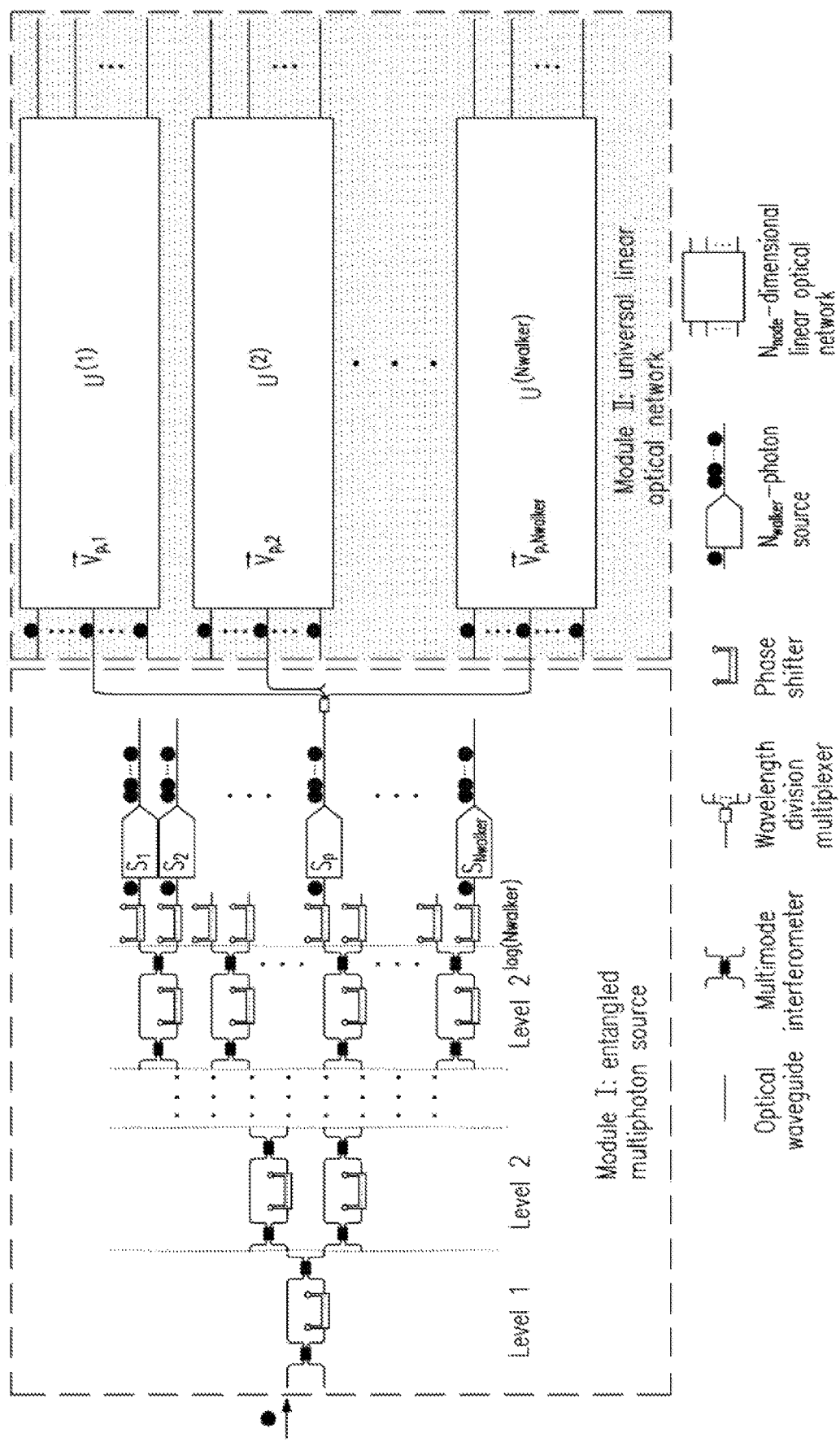
FIG. 2 is a schematic diagram of integrated photonic chip structure for universal quantum walk simulation.

An integrated photonic chip structure for universal quantum walk simulation, as shown in FIG. 1 and FIG. 2, by means of an integrated photonic approach, establishes mapping between on-chip spatially entangled multi-photon state and quantum walk state and mapping between on-chip unitary transformation and evolution process of multi-particle quantum walk by combining on-chip spatially entangled multi-photon preparation module with universal linear optical network module. Different spatially entangled multi-photon states are generated by the on-chip spatially entangled multi-photon preparation module to configure properties of particles (including particle indistinguishability and particle exchange symmetry) evolved in quantum walks. Different optical unitary transformations are configured by the universal linear optical networks on chip to implement quantum walk evolutions with different initial evolution states, evolution times and Hamiltonians. The evolution states of quantum walks are obtained via off-chip multiphoton coincidence measurement. The universal quantum walk simulation is thus finally completed.

Taking a specific example that a universal quantum walk simulation chip structure for $N_{walker}$ particles whose indistinguishability γ and exchange symmetry φ can be manipulated to perform multi-particle quantum walk on a graph G with $N_{node}$ vertices and Hamiltonian $H_G$, the chip structure comprises a configurable entangled multiphoton source module I and a universal linear optical network module II.

The configurable entangled multiphoton source module I comprises $N_{walker}$ $N_{walker}$-photon sources and a [$\log_2 N_{walker}$]-level Mach-Zehnder interferometer network, the $N_{walker}$ $N_{walker}$-photon sources are denoted as $S_1$, $S_2$, ..., $S_k$, ... $S_{N_{walker}}$, and the Mach-Zehnder interferometer consists of one phase shifter connected with two multimode interferometers.

The Mach-Zehnder interferometers in the [$\log_2 N_{walker}$]-level Mach-Zehnder interferometer network are listed following the structure of a "binary tree", that is, each output port of the Mach-Zehnder interferometer at a previous level is connected with one input port of the Mach-Zehnder interferometer at the next level, and $2^{\log_2 N_{walker}}$ output ports of the Mach-Zehnder interferometer at the end level are respectively connected with one phase shifter and one $N_{walker}$-photon source.

The universal linear optical network module II comprises $N_{walker}$ universal linear optical networks that each of the networks can implement required $N_{node}$-dimensional unitary transformation, where $N_{walker} \leq N_{node}$, the $N_{walker}$ universal linear optical networks which can implement the required $N_{node}$-dimensional unitary transformation are denoted as $U^{(1)}, U^{(2)}, \ldots, U^{(N_{walker})}$. When the module I is connected with the module II, the $N_{walker}$ photons are injected into $N_{walker}$ ports of the $N_{node}$-dimensional universal linear optical network, port sequences are denoted as $\{k_1, k_2, \ldots, k_{N_{walker}-1}, k_{N_{walker}}\}$, with sequences being $\vec{v}_1=\{k_1, k_2, \ldots, k_{N_{walker}-1}, k_{N_{walker}}\}$, $\vec{v}_2=\{k_{N_{walker}}, k_1, k_2, \ldots, k_{N_{walker}-1}\}, \ldots$ and $\vec{v}_{N_{walker}}=\{k_2, \ldots, k_{N_{walker}-1}, k_{N_{walker}}, k_1\}$, each serial number k herein represents the corresponding input port number of the $N_{walker}$ linear optical networks. In addition, $\vec{v}_{p,q}$ represents the $q^{th}$ element of $\vec{v}_p$. The $N_{walker}$ photons with different wavelengths generated by the $m^{th} N_{walker}$-photon source pass through a wavelength division multiplexer and are respectively injected into the corresponding input ports of each linear optical network $U^{(1)}, U^{(2)}, \ldots, U^{(N_{walker})}$ according to the sequence $\vec{v}_m$.

The phase shifters in the configurable entangled multiphoton source module are configured according to indistinguishability $\gamma$ and exchange symmetry $\phi$ of the required $N_{walker}$ particles and the initial state of quantum walk, so that a corresponding spatially entangled multi-photon state is generated at the entry of each optical network in the universal linear optical network module. Then, the phase shifters in each linear optical network in the universal linear optical network module are configured according to the Hamiltonian $H_G$ and walk time t of the quantum walk to implement unitary transformation $U(H_G, t) = e^{-iH_Gt}$. In the example of universal two-particle quantum walk simulation, two-photon coincidence is measured at the end output of the universal linear optical network module to obtain probability distribution P of output positions of the two photons. According to a deterministic relationship $\Gamma_{r,q}^{\gamma,\phi} = \mu P_{r,q}^{\gamma,\phi}$ between the measured probability distribution P of on-chip spatially entangled two-photon state and the theoretical distribution $\Gamma$ of two-particle quantum walks, where $\mu = 1/2 (1+\gamma+2\gamma\sqrt{1-\gamma^2})$, the distribution $\Gamma$ of the $N_{walker}$ particles quantum walk of t time of on the graph G can be similarly obtained, with indistinguishability being $\gamma$ and exchange symmetry being $\phi$.

Example 1

Figure 3:
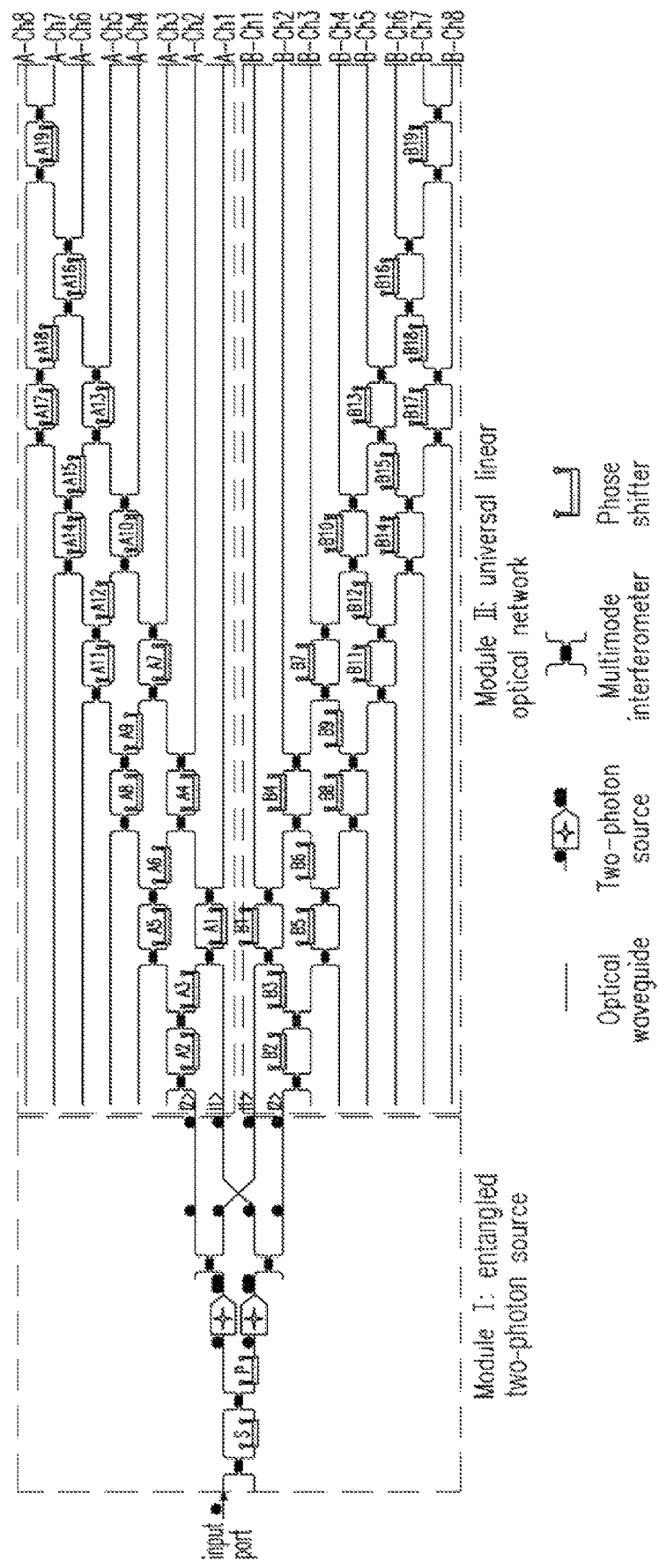
FIG. 3 is a schematic diagram of integrated photonic chip structure for universal quantum walk simulation for the simulation of quantum walk of two quantum particles on an eight-node graph.

A photonic chip structure for universal quantum walk simulation with two quantum particles starting from nodes 1 and 2 on a 8-node graph G, as shown in FIG. 3, consists of two modules, with the first half being a reconfigurable entangled two-photon source module I, and the second half being a universal linear optical network module II composed of two 8-dimensional universal linear optical networks A and B, with each optical network capable of implementing universal linear optical unitary transformation with fixed input ports (1 and 2 here). The whole chip has 40 controllable phase shifters. When the chip is used to simulate distribution results of two particles quantum walks with the parameters of indistinguishability $\gamma$, exchange symmetry $\phi$, walk time t and walk Hamiltonian $H_G$ and starting from nodes 1 and 2, the chip needs to be configured and manipulated as follows:

1. Two phase shifters S and P in the reconfigurable entangled multiphoton source module I are configured to generate a two-photon state with $$|\psi(\Phi)\rangle = \frac{1}{\sqrt{2}} \left( \frac{\gamma + \sqrt{1-\gamma^2}}{\sqrt{\mu}} a_1^\dagger b_2^\dagger + e^{i\phi} \frac{\gamma}{\sqrt{\mu}} a_2^\dagger b_1^\dagger \right) |0\rangle,$$

where $\mu = \frac{1}{2}(1 + \gamma + 2\gamma\sqrt{1-\gamma^2})$;

2. The 38 phase shifters $A_1$ to $A_{19}$ and $B_1$ to $B_{19}$ in the two general linear optical networks A and B in the universal linear optical network module II are configured, so that each optical network can implement the unitary transformation such as $e^{-iH_Gt}$.

3. Two-photon coincidence is measured at output ports of the two optical networks A and B to measure probability distribution P of the two output photons. According to a deterministic relationship $\Gamma_{r,q}^{\gamma,\phi} = \mu P_{r,q}^{\gamma,\phi}$ between the measured probability distribution P of the on-chip spatially entangled two-photon state and the theoretical distribution $\Gamma$ of two-particle quantum walk, the distribution $\Gamma$ of the two-particle quantum walks of time t on graph G is obtained, with the particle indistinguishability being $\gamma$ and particle exchange symmetry being $\phi$.

In particular, in the case that the chip is used to simulate the quantum walks of two identical bosons, with the specific parameters of quantum walk as: indistinguishability being $\gamma=1$, exchange symmetry being $\phi=0$, walk time being $t=\pi$, and starting from two adjacent nodes 1 and 2 of an eight-node ring, each phase value of the phase shifters to be configured is listed in Table 1.

Table 1 Phase configuration of each phase shifter in the chip shown in FIG. 3, for simulating the quantum walks with two identical bosons starting from two nodes 1 and 2 of an 8-node ring and the evolution time being $t=\pi$:

| Phase shifter label | Setting value |
| --- | --- |
| S | 1.5708 |
| P | 0 |
| $A_1$ | 0.7513 |
| $A_2$ | 0.7501 |
| $A_3$ | 2.7665 |
| $A_4$ | 0.7501 |
| $A_5$ | 0.7513 |
| $A_6$ | 5.9081 |
| $A_7$ | 0 |
| $A_8$ | 0.8093 |
| $A_9$ | 1.1661 |
| $A_{10}$ | 0.8093 |
| $A_{11}$ | 0 |
| $A_{12}$ | 4.525 |
| $A_{13}$ | 1.8403 |
| $A_{14}$ | 1.5708 |
| $A_{15}$ | 5.4978 |
| $A_{16}$ | 1.5708 |
| $A_{17}$ | 1.8403 |
| $A_{18}$ | 2.3562 |
| $A_{19}$ | 0 |
| $B_1$ | 0.7513 |
| $B_2$ | 0.7501 |
| $B_3$ | 2.7665 |
| $B_4$ | 0.7501 |
| $B_5$ | 0.7513 |
| $B_6$ | 5.9081 |
| $B_7$ | 0 |
| $B_8$ | 0.8093 |
| $B_9$ | 1.1661 |
| $B_{10}$ | 0.8093 |

-continued

| Phase shifter label | Setting value |
| --- | --- |
| $B_{11}$ | 0 |
| $B_{12}$ | 4.525 |
| $B_{13}$ | 1.8403 |
| $B_{14}$ | 1.5708 |
| $B_{15}$ | 5.4978 |
| $B_{16}$ | 1.5708 |
| $B_{17}$ | 1.8403 |
| $B_{18}$ | 2.3562 |
| $B_{19}$ | 0 |

A key point of the present invention is to combine the multiphoton source that can generate the multiphoton spatial entangled state and the linear optical network that can implement the required unitary transformation. The multiple-particle quantum walk in a network is simulated by letting each of the on-chip spatial entangled multiple-photons passing through the separate networks that each of them implements the same unitary transformation to be simulated. By manipulating the multi-photon spatial-entangled state, properties of the particles involved in the quantum walk evolution can be configured, such as particle indistinguishability and particle exchange symmetry (particle exchange symmetry refers to the bosonic, anyon-like and fermionic behaviors). The initial state, Hamiltonian and evolution time of the quantum walk can be programmed by reconfiguring the linear optical networks. In the end, the simulation of quantum walks with the control over all parameters including the evolution Hamiltonian, evolution time, initial state and particle properties can be implemented.

The above description is only the preferred embodiment of the present invention, and it should be pointed out that a person skilled in the art may make some improvements and modifications without departing from the principle of the present invention, but these improvements and modifications also fall into the protection scope of the present invention.

What is claimed is:

1. An integrated photonic chip structure for universal quantum walk simulation, comprising a module of reconfigurable entangled multiphoton and a module of universal linear optical networks, wherein a number of particles involved in quantum walk is $N_{walker}$ and a number of vertices of a graph G on which the walk evolving is $N_{node}$, the reconfigurable entangled multiphoton source module comprises $N_{walker}$ sources that each of the sources can generate $N_{walker}$-photon sources and $[log_2 N_{walker}]$-level Mach-Zehnder interferometer network, and the $N_{walker}$-photon sources are denoted as $S_1, S_2, \ldots, S_k, \ldots S_{N_{walker}}$, the Mach-Zehnder interferometers in the $[log_2 N_{walker}]$-level Mach-Zehnder interferometer network are listed following the structure of a binary tree, that is, each output port of the Mach-Zehnder interferometer at a previous level is connected with one input port of the Mach-Zehnder interferometer at a next level, and $2^{log_2 N_{walker}}$ output ports of the Mach-Zehnder interferometers at the end level are respectively connected with one phase shifter and one $N_{walker}$-photon source, the universal linear optical network module comprises $N_{walker}$ universal linear optical networks that each of them can implement required $N_{node}$-dimensional unitary transformation, where $N_{walker} \leq N_{node}$, and the $N_{walker}$ universal linear optical networks that are capable of implementing the required $N_{node}$-dimensional unitary transformation are denoted as $U^{(1)}, U^{(2)}, \ldots, U^{(N_{walker})}$, each $N_{walker}$-photon source generates $N_{walker}$ photons of different wavelengths, the photons pass through a wavelength division multiplexer and then are respectively routed to entries of the universal linear optical networks $U^{(1)}, U^{(2)}, \ldots, U(N_{walker})$, and the photons generated by the $m^{th}$ $N_{walker}$-photon source $S_m$ are respectively injected into corresponding input ports of each linear optical network according to a sequence $\vec{v}_m$, wherein port sequences are denoted as $\{k_1, k_2, \ldots, k_{N_{walker}-1}, k_{N_{walker}}\}$, with the sequences being $\vec{v}_1 = \{k_1, k_2, \ldots, k_{N_{walker}-1}, k_{N_{walker}}\} \vec{v}_2 = \{k_{N_{walker}}, k_1, k_2, \ldots, k_{N_{walker}-1}\} \ldots$ and $\vec{v}_{N_{walker}} = \{k_2, \ldots, k_{N_{walker}-1}, k_{N_{walker}}, k_1\}$, where each serial number k represents the corresponding input port of the $N_{walker}$ linear optical networks, the phase shifters in the reconfigurable entangled multiphoton source module are configured according to indistinguishability γ and exchange symmetry φ of the $N_{walker}$ particles and initial state of the walk, so that corresponding spatially entangled multi-photon state is generated at the entry of each optical network in the universal linear optical network module, then, the phase shifters in each linear optical network in the universal linear optical network module are configured according to a Hamiltonian $H_G$ and walk time t of a quantum walk to implement unitary transformation, two-photon coincidence is measured at an output end of the universal linear optical network module to obtain probability distribution P of output positions of the two photons, according to a deterministic relationship $\Gamma_{r,q}^{\gamma,\Phi} = \mu_{r,q}^{\gamma,\Phi}$ between a measured probability distribution P of on-chip spatial-entangled two-photon state and the theoretical distribution Γ of two-particle quantum walk, where $\mu = 1/2(1+\gamma+2\gamma\sqrt{1-\gamma^2})$, the distribution Γ of $N_{walker}$ particles quantum walk of t evolution time on the graph G can be similarly obtained, with the indistinguishability being γ and exchange symmetry being φ.

2. The integrated photonic chip structure for universal quantum walk simulation of claim 1, wherein the Mach-Zehnder interferometer consists of one phase shifter connected with two multimode interferometers.

3. The integrated photonic chip structure of universal quantum walk simulation of claim 2, wherein in the simulated quantum walk, the $N_{walker}$ particles are injected into $N_{walker}$ ports of the $N_{node}$-dimensional universal linear optical network, and $\vec{v}_{p,q}$ represents the $q^{th}$ element of $\vec{v}_p$, and the $N_{walker}$ photons generated by the $m^{th}$ $N_{walker}$-photon source are injected into the corresponding input port of each linear optical network according to sequence $\vec{v}_m$.

* * * * *